United States Patent
Hikmet et al.

(10) Patent No.: US 10,781,981 B2
(45) Date of Patent: Sep. 22, 2020

(54) LIGHTING DEVICE COMPRISING A COMMUNICATION ELEMENT FOR WIRELESS COMMUNICATION

(71) Applicant: SIGNIFY HOLDING B.V., Eindhoven (NL)

(72) Inventors: Rifat Ata Mustafa Hikmet, Eindhoven (NL); Ties Van Bommel, Horst (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 40 days.

(21) Appl. No.: 16/329,778

(22) PCT Filed: Sep. 18, 2017

(86) PCT No.: PCT/EP2017/073424
§ 371 (c)(1),
(2) Date: Mar. 1, 2019

(87) PCT Pub. No.: WO2018/050884
PCT Pub. Date: Mar. 22, 2018

(65) Prior Publication Data
US 2019/0242535 A1      Aug. 8, 2019

(30) Foreign Application Priority Data
Sep. 19, 2016  (EP) ..................... 16189451

(51) Int. Cl.
*F21K 9/61*       (2016.01)
*F21V 23/04*     (2006.01)
(Continued)

(52) U.S. Cl.
CPC .............. *F21K 9/61* (2016.08); *F21V 23/045* (2013.01); *G02B 6/001* (2013.01); *H05B 47/19* (2020.01); *F21K 9/232* (2016.08); *F21Y 2115/10* (2016.08)

(58) Field of Classification Search
CPC ..... F21V 23/045; C12M 33/44; C12M 41/48; H01Q 11/08; H01Q 9/27; H01Q 1/40; H01Q 1/24; H01Q 1/06; H01Q 1/44
See application file for complete search history.

(56) References Cited

U.S. PATENT DOCUMENTS 6,039,459 A * 3/2000 Chang ................. F21V 19/0065
                                                         362/253
6,262,686 B1 * 7/2001 Delarminat .............. H01Q 1/06
                                                         343/703
(Continued)

FOREIGN PATENT DOCUMENTS

| EP | 2372765 A1 | 10/2011 |
| EP | 2989373 A1 | 3/2016 |

*Primary Examiner* — Amy Cohen Johnson
*Assistant Examiner* — Syed M Kaiser
(74) *Attorney, Agent, or Firm* — Daniel J. Piotrowski

(57) ABSTRACT

A lighting device (1) is disclosed, which comprises a light guide (2) arranged to guide light. The light guide (2) may be constituted by or comprise an elongated light guide (2) having a central axis (3). The light guide (2) may comprise a core section (14) extending along the central axis (3) and being arranged to guide light. The light guide (2) may comprise a cladding section (15; 17, 18) which is at least in part surrounding the core section (14), is coupled to the core section (14) at an inner surface (16) of the cladding section (15; 17, 18), and is extending along the central axis (3). The lighting device (1) comprises at least one communication element (20) mechanically connected to the light guide (2). The at least one communication element (20) is arranged for wireless communication.

11 Claims, 4 Drawing Sheets

(51) Int. Cl.
 *H05B 47/19* (2020.01)
 *F21V 8/00* (2006.01)
 *F21Y 115/10* (2016.01)
 *F21K 9/232* (2016.01)

(56) References Cited

U.S. PATENT DOCUMENTS

| | | | | |
|---|---|---|---|---|
| 6,774,341 B2* | 8/2004 | Ohta | ................ | B23K 26/38 |
| | | | | 219/121.72 |
| 8,894,260 B2* | 11/2014 | Vasic | ................ | G02B 6/0045 |
| | | | | 362/559 |
| 9,750,103 B2* | 8/2017 | Mathews | ............ | F21V 23/0464 |
| 10,355,340 B2* | 7/2019 | Marinus | ................ | F21K 9/232 |
| 2007/0137255 A1* | 6/2007 | Miyake | ................ | G02B 6/381 |
| | | | | 65/393 |
| 2008/0236831 A1* | 10/2008 | Hsu | ................ | C10G 1/02 |
| | | | | 166/302 |
| 2009/0189617 A1* | 7/2009 | Burns | ................ | E21B 36/04 |
| | | | | 324/649 |
| 2009/0267847 A1* | 10/2009 | Sato | ................ | H01Q 9/32 |
| | | | | 343/713 |
| 2011/0006898 A1 | 1/2011 | Kruest et al. | | |
| 2011/0116751 A1* | 5/2011 | Terlizzi | ................ | G02B 6/3817 |
| | | | | 385/88 |
| 2012/0092131 A1* | 4/2012 | Vasic | ................ | G02B 6/0045 |
| | | | | 340/10.1 |
| 2012/0092623 A1* | 4/2012 | Huebner | ................ | G03B 21/001 |
| | | | | 352/81 |
| 2013/0063317 A1 | 3/2013 | Jonsson et al. | | |
| 2013/0135359 A1* | 5/2013 | Gally | ................ | G06F 3/0428 |
| | | | | 345/690 |
| 2013/0331037 A1* | 12/2013 | Kusakari | ................ | G01S 15/02 |
| | | | | 455/66.1 |
| 2015/0195892 A1 | 7/2015 | Park et al. | | |
| 2016/0041324 A1 | 2/2016 | Nava et al. | | |
| 2016/0133805 A1* | 5/2016 | Park | ................ | H01L 33/58 |
| | | | | 438/15 |
| 2016/0377272 A1* | 12/2016 | Chen | ................ | F21V 5/04 |
| | | | | 362/235 |
| 2016/0377278 A1* | 12/2016 | Kato | ................ | F21K 9/232 |
| | | | | 362/363 |
| 2017/0059095 A1* | 3/2017 | Van Bommel | ................ | F21K 9/90 |
| 2017/0135633 A1* | 5/2017 | Connor | ................ | A61B 5/4866 |
| 2017/0324011 A1* | 11/2017 | Hwang | ................ | H01L 33/44 |
| 2017/0352942 A1* | 12/2017 | Marinus | ................ | F21K 9/232 |
| 2019/0019826 A1* | 1/2019 | Gotou | ................ | H01L 27/14 |
| 2019/0104239 A1* | 4/2019 | Aschwanden | ...... | H04M 1/0264 |
| 2019/0242535 A1* | 8/2019 | Hikmet | ................ | F21K 9/61 |

\* cited by examiner

LIGHTING DEVICE COMPRISING A COMMUNICATION ELEMENT FOR WIRELESS COMMUNICATION

CROSS-REFERENCE TO PRIOR APPLICATIONS

This application is the U.S. National Phase application under 35 U.S.C. § 371 of International Application No. PCT/EP2017/073424, filed on Sep. 18, 2017, which claims the benefit of European Patent Application No. 16189451.4 filed on Sep. 19, 2016. These applications are hereby incorporated by reference herein.

TECHNICAL FIELD

The present invention relates to a lighting device comprising at least one communication element capable of wireless communication, and a lamp, luminaire or lighting system comprising the lighting device.

BACKGROUND

The use of solid state lighting devices, such as light-emitting diodes (LEDs), for illumination purposes continues to attract attention. Compared to incandescent lamps, fluorescent lamps, gas discharge lamps, etc., solid state based light sources may provide numerous advantages such as, inter alia, longer operational life, reduced power consumption, higher efficacy, less heat generation, green environmental products (i.e. not including mercury). Solid state lighting devices such as LEDs are employed in a wide range of lighting applications, such as, for example, general lighting. LEDs are advantageous since they may allow for a relatively simple control of the emitted light for example with respect to dimming and color setting. In a lighting system comprising LEDs (or other solid state lighting devices) such control may be realized by means of the lighting system receiving control signals for controlling the operation of the LEDs by way of wireless radio frequency (RF) communication. The control signals may for example be transmitted by some control device or lighting system controller capable of wireless communication. The wireless RF communication capability of the lighting system may be implemented by employing an RF antenna, which for example may be positioned on the surface of a heat sink, as disclosed in US 2011/0006898 A1. This may allow for the lighting system to be operated in conjunction with wireless home automation systems or the like. It is generally desired that the antenna has a well-defined position, is mechanically supported, and can be fabricated with relative ease. It is also generally desired that the antenna does not interfere with the optical path of the lighting device(s) (or that it does so only to a relatively small extent).

EP 2989373 A1 discloses an optical structure for processing the light output by a lighting unit, in which an antenna is formed within or over an region of the optical layer of the structure, wherein the region is away from the optical beam processing parts a of the optical layer.

US 2013063317 A1 discloses an antenna which is integrated with an optical element, such as a lens, a collimator, a diffuser, a reflector, or some other part that allows at least some light to pass through or reflects light. In some embodiments, the antenna is molded into the optical element. In other embodiments, the antenna is printed on, or attached to, the surface of the optical element. The antenna may be formed from a transparent or a non-transparent conductor, depending on the embodiment.

SUMMARY

In view of the above discussion, a concern of the present invention is to achieve a lighting device having an antenna that has a well-defined position in the lighting device, is mechanically supported in the lighting device, and/or that does not, or only to a relatively small extent, interfere with the optical path of the lighting device.

To address at least one of this concern and other concerns, a lighting device in accordance with the independent claim is provided. Preferred embodiments are defined by the dependent claims.

According to a first aspect of the present invention there is provided a lighting device comprising a light guide which is arranged to guide light. The lighting device comprises at least one communication element mechanically coupled or connected to the light guide. The at least one communication element is arranged for, or capable of, wireless communication.

The light guide is arranged to guide light, and may be used to guide light to be output from the lighting device. By means of the at least one communication element being mechanically connected or coupled to the light guide, the at least one communication element may not interfere with the optical path of the lighting device, or only do so to a relatively small extent or degree. By means of the at least one communication element being mechanically connected or coupled to the light guide, the at least one communication element may have a well-defined position within the lighting device. Further, the lighting device may be manufactured with relative ease.

The at least one communication element may for example be arranged for, or capable of, radio frequency (RF) wireless communication (and may thus comprise at least one (RF) antenna element), but is not limited thereto. In alternative or in addition, the at least one communication element may for example comprise at least one infrared antenna.

The light guide is constituted by or comprise an elongated light guide having a central axis. The light guide comprises a core section, which may extend along the central axis, and which core section may be arranged to guide light.

The at least one communication element may be directly or indirectly mechanically coupled, connected, fastened or attached to the light guide. For example, the at least one communication element may be mechanically coupled or connected, or fastened or attached, to the light guide by way of a glue connection or coupling, or by winding at least a portion of the at least one communication element around the light guide (e.g., around the core section), possibly in a plurality of windings. In alternative or in addition, and according to another example, the at least one communication element may be mechanically coupled or connected, or fastened or attached, to the light guide by way of at least a portion of the at least one communication element being integrally arranged within a portion of the light guide.

The light guide comprises a cladding section, or cladding layer. The cladding section is at least in part surround the core section. The cladding section is coupled to the core section at an inner surface of the cladding section. The cladding section extends along the central axis. The at least one communication element is mechanically connected or coupled to the cladding section.

The cladding section may have a lower index of refraction than the core section, whereby light coupled into the core section may be guided substantially within the core section, along the central axis, via total internal reflection (TIR). With the at least one communication element being mechanically coupled to the cladding section (and not to the core section, or possibly only to a relatively small extent), any light generated in the lighting device may be conveyed or transmitted to a desired location in the lighting device (e.g., in the light guide) where it can be out-coupled from the lighting device without, or substantially without, the at least one communication element extracting any light out of the core section before the light reaches the desired location where it can be out-coupled from the lighting device. The cladding section is further advantageous in that it may provide protection for the core section. Furthermore, the cladding section may facilitate the guiding of light substantially within the core section by way of TIR.

The lighting device may possibly comprise a plurality of communication elements mechanically connected or coupled to the light guide (such as, for example, to the cladding section, or to the core section), such as two, three, four or five communication elements, or even more, wherein each may be mechanically connected or coupled to the light guide.

The light guide may for example comprise or be constituted by an optical fiber. The light guide, or optical fiber, may for example have a cross section in a plane that is (possibly substantially) perpendicular to the central axis of the light guide or optical fiber that is circular, or substantially circular. However, it is to be understood that this is according to an example, and that other shapes and geometrical configurations of the light guide, or optical fiber, are possible. For example, the light guide or optical fiber may have a cross section in a plane that is (possibly substantially) perpendicular to the central axis of the light guide or optical fiber that is oval, or substantially oval.

The at least one communication element comprises or is constituted by an elongated element, and extends generally along the central axis of the light guide. The at least one communication element may for example be mechanically coupled or connected to the light guide so as to extend a selected distance along the length of the light guide. The at least one communication element may for example comprise an electrically conductive, transparent layer, for example including indium tin oxide, and/or an electrically conducting polymer such as Polyaniline or PEDOT (Poly(3,4-ethylenedioxythiophene)). In alternative or in addition, the at least one communication element may for example comprise a copper wire or a copper strip.

The at least one communication element may possibly be longer than the length of the light guide. For example, the at least one communication element may have a length that is about 1.2 times the length of the light guide, or possibly more than 1.2 times the length of the light guide.

The at least one communication element may possibly not extend along the entire length of the light guide. According to one or more embodiments of the present invention, the at least one communication element may have a length that is about half, or about one third, of the length of the light guide or less. The at least one communication element may for example have a length that is a few centimeters, such as (about) 3 cm.

The at least one communication element may for example comprise at least one antenna. The antenna may be a straight monopole antenna. The length of the antenna may for example be (approximately) equal to $\lambda/4$, where $\lambda$ is the wavelength of a signal that the antenna is configured to receive. For example, a frequency used for WIFI is 2.4 GHz. This means that the length of the antenna may for example be (about) 3.1 cm. (A frequency of 1 GHz may correspond to a wavelength $\lambda$ of (about) 30 cm, i.e. $\lambda/4$ may be (about) 7.5 cm.)

The light guide may comprise a light in-coupling portion for coupling of light into the light guide (e.g., into the core section). For example, the core section may comprise the light in-coupling portion.

The lighting device may comprise at least one light-emitting element configured to emit light. The at least one light-emitting element may be optically coupled to the light in-coupling portion, such that light emitted by the at least one light-emitting element is coupled into the light guide (e.g., into the core section) via the light in-coupling portion. The light guide (e.g., the core section) may be arranged to guide light coupled into the light guide (e.g., into the core section) to a light out-coupling portion of the light guide for coupling of light out of the light guide. The light guide may possibly comprise several light out-coupling portions.

According to one or more embodiments of the present invention, the at least one communication element may be mechanically coupled or connected to the light guide at a section thereof where there is (are) no light out-coupling portion(s). For example, the light guide may be sectionalized, with one section to which the at least one communication element may be mechanically coupled or connected, and with another adjoining section of the light guide to which the at least one communication element is not mechanically coupled or connected but which may include light out-coupling portion(s). The latter section of the light guide may possibly have an adjoining section of the light guide to which the at least one communication element is not mechanically coupled or connected, and which does not include any light out-coupling portion. One or more of the above-mentioned sections of the light guide may extend a predefined distance along the central axis of the light guide, e.g., a few centimeters, such as (about) 3 cm.

The at least one light-emitting element may for example be configured to emit light when operated or activated.

In the context of the present application, by the core section and/or the cladding section extending along the central axis of the light guide, the core section and/or the cladding section may for example extend parallel to the central axis of the light guide.

The light in-coupling portion of the light guide may for example comprise one or more light in-coupling surfaces arranged on the light guide, and/or one or more light in-coupling elements such as lenses.

The lighting device may according to one or more embodiments of the present invention comprise several light guides, which may be identical or substantially identical.

The central axis of the light guide may be at least in part straight, or substantially straight. However, it is to be understood that the central axis of the light guide may be at least in part curved. For example, the light guide may be shaped according to a coil. The light guide may be arranged such that it comprises one or more portions or segments wherein the central axis of the light guide is straight, or substantially straight, and one or more other portions or segments wherein the central axis of the light guide is curved.

The core section and the cladding section may have different refractive indices. For example, the core section may comprise a higher index of refraction material compared to the material of the cladding section. Thereby, light that is coupled into the light in-coupling portion (e.g., a surface) may be guided substantially within the core section, along the central axis, via TIR. In a case where the light guide does not include a cladding section which is at least in part surrounding the core section, light may still be guided substantially within the core section (possibly along the central axis) via TIR, by way of difference in refractive indices of the material of the core section and the medium surrounding the core section, which for example may be air. Stated in another way, the light guide does not need to have a cladding, and air (and/or any other medium surrounding the core section) may instead possibly act as cladding.

The cladding section is made of optically transparent material. The cladding section is transparent for light which is coupled out of the core section at a desired position via a light out-coupling portion.

The cladding section may for example be bonded to the core section by means of any bonding means or techniques known in the art.

In the context of the present application, a cladding section should be understood to mean substantially any component and/or material at least in part surrounding the core section that is arranged to guide light.

The light guide, or the core section of the light guide, may for example comprise a high refractive index glass, such as, for example, quartz, or silica, and/or a high refractive index polymer such as Poly(methyl methacrylate) (PMMA), Polystyrene (PS) and/or Polycarbonate (PC).

As mentioned in the foregoing, the light guide may for example comprise or be constituted by an optical fiber. The optical fiber may for example be made of glass (silica) and/or polymers. The optical fiber may for example comprise a plastic optical fiber.

The cladding section or cladding layer may for example comprise a plastic. The material of the core section and/or the material of the cladding section is/are preferably selected so that the core section comprises a higher index of refraction material compared to the material of the cladding section. The material of the cladding section may for example comprise a fluorinated polymer.

The at least one light-emitting element may be controllable with respect to characteristics or properties of light emitted by the at least one light-emitting element.

To that end, the at least one light-emitting element may for example include or be constituted by a solid state light emitter. Examples of solid state light emitters include LEDs, organic LEDs (OLEDs), and laser diodes. Solid state light emitters are relatively cost efficient light sources since they in general are relatively inexpensive and have a relatively high optical efficiency and a relatively long lifetime. However, in the context of the present application, the term "light-emitting element" should be understood to mean substantially any device or element that is capable of emitting radiation in any region or combination of regions of the electromagnetic spectrum, for example the visible region, the infrared region, and/or the ultraviolet region, when activated e.g. by applying a potential difference across it or passing a current through it. Therefore a light-emitting element can have monochromatic, quasi-monochromatic, polychromatic or broadband spectral emission characteristics. Examples of light-emitting elements include semiconductor, organic, or polymer/polymeric LEDs, violet LEDs, blue LEDs, optically pumped phosphor coated LEDs, optically pumped nano-crystal LEDs or any other similar devices as would be readily understood by a person skilled in the art. Furthermore, the term light-emitting element can, according to one or more embodiments of the present invention, mean a combination of the specific light-emitting element or light-emitting elements which emit the radiation in combination with a housing or package within which the specific light-emitting element or light-emitting elements are positioned or arranged. For example, the term light-emitting element can encompass a bare LED die arranged in a housing, which may be referred to as a LED package.

The at least one communication element may be communicatively coupled to the at least one light-emitting element. The at least one communication element may for example be communicatively coupled to the at least one light-emitting element by means of a wired and/or wireless communication link as known in the art, for transmitting of signals, commands, data, etc., between the at least one communication element and the at least one light-emitting element, possibly via some intermediate communication module.

The at least one light-emitting element may be configured to receive at least one control signal from the at least one communication element for controlling operation of the at least one light-emitting element. The at least one control signal may have been received by means of wireless communication by the at least one communication element. The at least one control signal may for example have been transmitted to the lighting device (or to the at least one communication element) by some control device or lighting system controller. The at least one light-emitting element—which as mentioned in the foregoing for example may comprise one or more LEDs or other type of solid state light emitter that is controllable with respect to characteristics or properties of emitted light—may thereby be relatively easily controlled with respect to operation thereof (for example with respect to dimming and color setting, and/or another or other properties of the emitted light).

The lighting device may comprise a control circuit, which may be electrically connected to the at least one communication element. The control circuit may further be directly or indirectly electrically connected to the at least one light-emitting element. For example, the control circuit may be electrically connected to the at least one light-emitting element via a substrate or carrier (e.g., comprising a circuit board) on which the at least one light-emitting element is arranged or mounted. The control circuit may be configured to control operation of the at least one light-emitting element. The control circuit may for example comprise a microcontroller and a radio frequency receiver. The control circuit may be integrated with a driver or driver circuit, but the control circuit may in alternative be a separately arranged unit. The control circuit may be powered by the driver.

The at least one communication element may optionally be configured to transmit signals, commands, data, etc. (e.g., signals or signaling relating to characteristics of light emitted by the at least one light-emitting element) to some entity or entities to which the lighting device may be communicatively coupled, such as, for example, a control device or lighting system controller.

Light may be out-coupled from the light guide, or the lighting device, in different ways. The light out-coupling portion of the light guide may be located at a desired position in the light guide.

At least a portion of the at least one communication element may be arranged such that it contacts the core section at at least one portion of the outer surface of the core section. Light which is guided in the core section and which impinges on a portion of the at least one communication element that is contacting the core section may be coupled out of the light guide. The at least one portion of the outer surface of the core section at which the at least one communication element contacts the core may hence constitute a light out-coupling portion of the light guide. Thus, the at least one communication element may be used, e.g., locally, to extract light out of the core section.

In alternative or in addition, the light out-coupling portion of the light guide may comprise at least one light out-coupling element. The at least one light out-coupling element may for example comprise scattering particles arranged within the core section and/or possibly within the cladding section. In alternative or in addition the at least one light out-coupling element may for example comprise surface irregularities at an outer surface of the core section and/or at an inner surface of the cladding section The scattering particles may for example comprise or be constituted by $Al_2O_3$ particles, $TiO_2$ particles and/or $BaSO_4$ particles. The surface irregularities may for example comprise or be constituted by (relatively small) deformations in the outer surface of the core section and/or the inner surface of the cladding section. Such deformations may for example be produced by scratching or etching.

It may be undesirable that the communication element is extracting, or out-coupling, light from the core section.

According to one or more embodiments, at least a portion of the at least one communication element may be integrally arranged within the cladding section. The (at least a portion of the) at least one communication element may for example be arranged so as to be extending within the cladding section along the central axis of the light guide. By integrally arranging at least a portion of the at least one communication element within the cladding section, it may be ensured that the communication element is not extracting, or out-coupling, light from the core section (or that the communication element is only doing so to a relatively small extent or degree).

The at least one communication element may be at least in part flexible. That is, at least a portion of the at least one communication element may be flexible. By the at least one communication element being at least in part flexible it is meant that at least a part of the at least one communication element may be bent, for example possibly so as to permit winding at least a part of the at least one communication element around another element or component.

According to one or more embodiments, at least a portion of the at least one communication element may be wound around the core section, possibly in a plurality of windings.

The core section and/or the cladding section may be at least in part flexible, so that it or they may be bent. For example, the core section and/or the cladding section may include materials which may be used in optical fibers and which may provide the desired flexibility.

The cladding section may comprise a multi-layered structure which may have a plurality of layers. Each of the layers may surround the core section. The layers may be arranged on top of each other, with an innermost layer that is closest to the core section, and one or more additional layers that are arranged successively on the innermost layer. Another way to describe the multi-layered structure is that the light guide may comprise a primary cladding section and one or more additional cladding sections, e.g., a secondary cladding section and possibly a tertiary cladding section, a quaternary cladding section, and so on.

At least a portion of the at least one communication element may be wound around the core section such that the at least one communication element is surrounded by at least one layer of the multi-layered structure. For example, at least a portion of the at least one communication element may be integrally arranged within the innermost layer (or primary cladding section) that is closest to the core section, and may be surrounded by at least one other layer of the multi-layered structure (which surrounds the innermost layer).

In alternative or in addition, at least a portion of the at least one communication element may be integrally arranged within a layer of the multi-layered structure other than the innermost layer that is closest to the core section. Another way to describe this is that at least a portion of the at least one communication element may be integrally arranged not, within the primary cladding section, but instead within the secondary cladding section, or possibly the tertiary cladding section, or the quaternary cladding section, etc. For example, at least a portion of the at least one communication element may be wound around one of the layers of the multi-layered structure other than the innermost layer that is closest to the core section.

At least a portion of the at least one communication element may be coupled to, or arranged on, an outer surface of the cladding section. For example, at least a portion of the at least one communication element may be glued to the outer surface of the cladding section. However, other means or techniques of coupling or attaching the at least one communication element to, or arranging the at least one communication element on, the outer surface of the cladding section are possible, as a person skilled in the art will realize.

In alternative or in addition, at least a portion of the at least one communication element may be embedded in a recessed portion in the outer surface of the cladding section. For example, the communication element may be pressed—possibly at relatively high temperature—into the outer surface of the cladding section, thereby forming a recessed portion in the outer surface of the cladding section. The recessed portion in the outer surface of the cladding section, and thus also the (portion of the) at least one communication element embedded in the recessed portion, may be extending along the central axis of the light guide.

As mentioned in the foregoing, the at least one communication element may be at least in part flexible. At least a portion of the at least one communication element may be wound around the outer surface of the cladding section, possibly in a plurality of windings. According to one or more embodiments of the present invention, the light guide may be shaped according to a coil, and the at least one communication element may be wound around the outer surface of the cladding section such that the at least one communication element is coiled around the light guide. In alternative or in addition, the at least one communication element may be wound around the outer surface of the cladding section such that the at least one communication element forms two or more loops about the light guide.

The lighting device may comprise an at least in part light-transmissive surface structure, or envelope. The at least in part light-transmissive surface structure or envelope may at least in part define a space in which at least a portion of the light guide may be arranged, such that the at least in part light-transmissive surface structure at least in part encloses the light guide. The at least in part light-transmissive surface structure may in principle have any shape. According to examples, the surface structure may be pear-shaped or tube-shaped. As the at least one communication element is mechanically connected to the light guide, the at least in part light-transmissive surface structure may possibly also enclose the at least one communication element.

The lighting device may comprise a base portion. The at least in part light-transmissive surface structure may be coupled to the base portion, for example by gluing them together. Possibly, the at least in part light-transmissive surface structure may be coupled to the base portion by means of some intermediate (support) structure, wherein the surface structure and the intermediate structure for example may be thermally bonded together, e.g. by 'melting' them together, after which the intermediate structure may be coupled to the base portion e.g. by means of a glue connection. The at least one light-emitting element may be arranged within the base portion. A portion of the light guide may be arranged within the base portion, and another portion of the light guide may be arranged within the space defined by the at least in part light-transmissive surface structure.

The at least in part light-transmissive surface structure or envelope may for example comprise one or more materials selected from glass, ceramics, or plastics. The at least in part light-transmissive surface structure may for example be made of—at least in part—glass, for example fused silica glass (vitreous silica glass), soda-lime-silica glass (window glass), sodium borosilicate glass (pyrex), lead-oxide glass (crystal glass), aluminosilicate glass, or oxide glass. In alternative or in addition, the surface structure may be made of, at least in part, sapphire and/or transparent or translucent ceramic, or comprise a ceramic part or portion such as a ceramic ring.

The space defined by the at least in part light-transmissive surface structure may at least in part be fluidly sealed and enclosed and may include or be filled with a thermally conductive fluid, for example a gas such as air or a gas including helium and/or hydrogen.

The lighting device may for example be included in or constitute a LED bulb or retrofit lamp which is connectable to a lamp or luminaire socket by way of some appropriate connector, for example an Edison screw base, a bayonet fitting, or another type of connection suitable for the lamp or luminaire known in the art. The connector may be connected to the base portion.

According to a second aspect of the present invention there is provided a lamp, luminaire or lighting system comprising at least one lighting device according to the first aspect.

Further objects and advantages of the present invention are described in the following by means of exemplifying embodiments. It is noted that the present invention relates to all possible combinations of features recited in the claims. Further features of, and advantages with, the present invention will become apparent when studying the appended claims and the description herein. Those skilled in the art realize that different features of the present invention can be combined to create embodiments other than those described herein.

BRIEF DESCRIPTION OF THE DRAWINGS

Exemplifying embodiments of the invention will be described below with reference to the accompanying drawings.

FIG. 7 illustrates a longitudinal section of the portion of the light guide.

Figure 1:
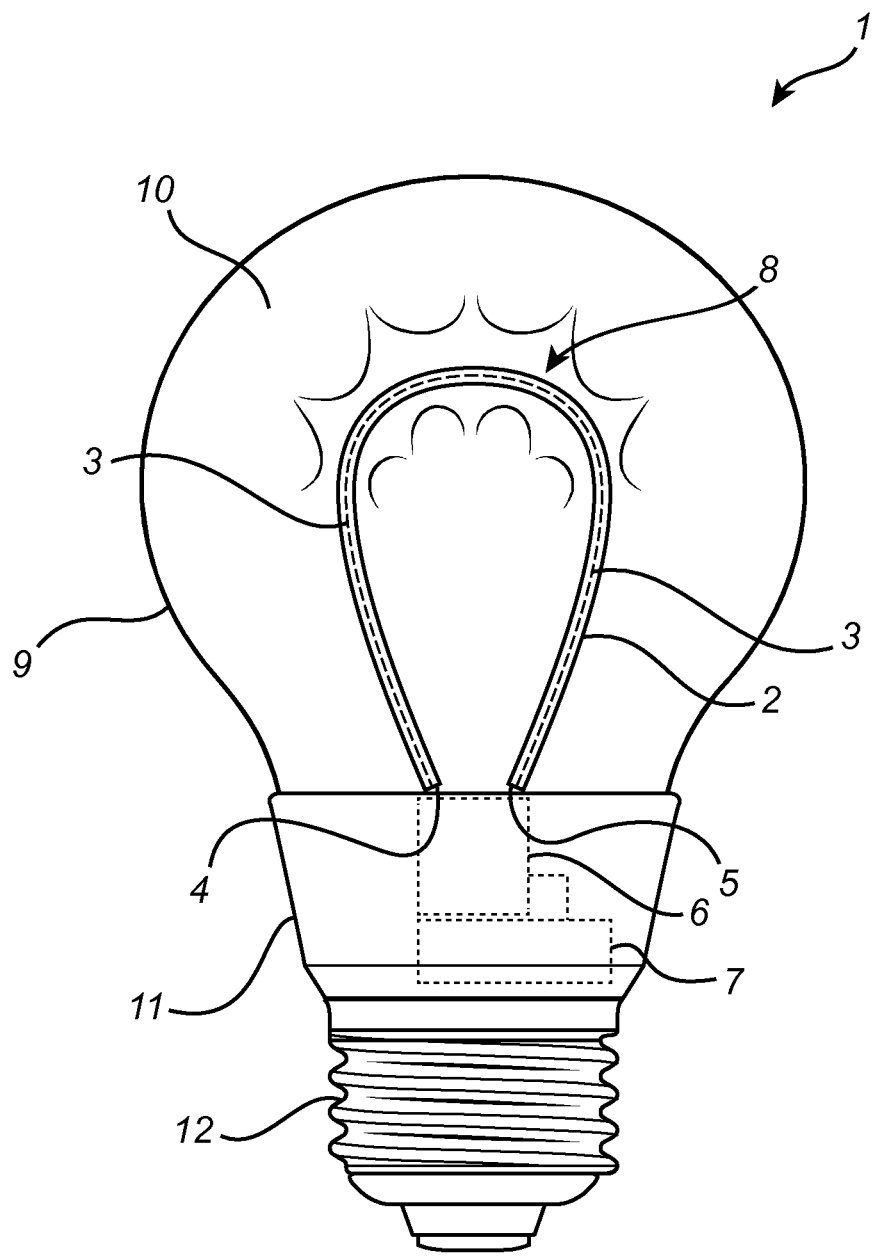
FIG. 1 is a schematic side view of a lighting device according to an embodiment of the present invention.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments of the present invention are provided by way of example so that this disclosure will convey the scope of the invention to those skilled in the art. In the drawings, identical reference numerals denote the same or similar components having a same or similar function, unless specifically stated otherwise.

According to the embodiments of the present invention illustrated in FIGS. 1-7 and described in the following, the light guide comprises a cladding section (or cladding layer). As indicated in the foregoing, the light guide does not need to have a separate cladding, and air (or any other medium surrounding the light guide, or possibly the core section thereof) may instead possibly act as cladding. Thus, the embodiments of the present invention illustrated in FIGS. 1-7 should be considered as exemplifying, and not limiting.

FIG. 1 is a schematic side view of a lighting device 1 according to an embodiment of the present invention. The lighting device 1 comprises an elongated light guide 2, which light guide 2 has a curved central axis 3. The light guide 2 may for example comprise an optical fiber, but is not limited thereto. The light guide 2 comprises a core section 14 (not shown in FIG. 1; cf. FIGS. 2 to 7) which extends along the central axis 3. The core section of the light guide 2 is arranged to guide light. As illustrated in FIG. 1, the light guide 2 may comprise two ends, and the light guide 2 may comprise light in-coupling portions 4, 5 for coupling of light into (the core section of the) light guide 2 arranged at the respective ones of the two ends of the light guide 2. For example, the core section 14 may comprise the light in-coupling portions 4, 5. The light in-coupling portions 4, 5 may for example comprise respective light in-coupling surfaces arranged on the light guide 2 (e.g., at the core section thereof). It is to be understood that according to one or more embodiments of the present invention, the light guide 2 may comprise a single light in-coupling portion, or more than two light in-coupling portions.

Although FIG. 1 shows one light guide 2 being comprised in the lighting device 1, the lighting device 1 may according to one or more embodiments of the present invention comprise several light guides, which light guides may possibly be identical or substantially identical.

It is to be understood that the shape of the light guide 2 illustrated in FIG. 1 is according to an example and that other shapes and geometrical configurations of the light guide 2 are possible. For example, according to one or more embodiments of the present invention, the central axis of the light guide may be at least in part straight, or substantially straight. Also, curved configurations of the light guide other than that illustrated in FIG. 1 are possible. For example, the light guide may be shaped according to a coil. Possibly, the light guide may be arranged such that it comprises one or more portions or segments wherein the central axis of the light guide is straight, or substantially straight, and one or more other portions or segments wherein the central axis of the light guide is curved.

The light guide 2 comprises a cladding section 15 (not shown in FIG. 1; cf. FIGS. 2 to 7). The cladding section 15 is at least in part surrounding the core section 14, and is coupled to the core section 14 at an inner surface 16 (not shown in FIG. 1; cf. FIGS. 2 to 7) of the cladding section 15. The cladding section 15 is extending along the central axis 3. As indicated in FIG. 1, the core section 14 and the cladding section 15 may be at least in part flexible.

The core section 14 and the cladding section 15 may have different refractive indices. For example, the core section 14 may comprise a higher index of refraction material compared to the material of the cladding section 15. Thereby, light that is coupled into the light in-coupling portions 4, 5 may be guided substantially within the core section 14 of the light guide 2, along the central axis 3, via total internal reflection (TIR). The cladding section 15 is made of optically transparent material. The cladding section 15 may for example be bonded to the core section 14 by means of any bonding means or techniques known in the art.

The lighting device 1 comprises a light-emitting element 6 configured to emit light. It is to be understood that the light-emitting element 6 is illustrated only schematically in FIG. 1. The light-emitting element 6 may for example be configured to emit light when operated or activated. In accordance with the illustrated embodiment of the present invention, the light-emitting element 6 may for example comprise one or more LEDs (or another or other types of solid state light emitters). As known in the art, the lighting device 1 may include circuitry 7 capable of converting electricity from a power supply to electricity suitable to operate or drive the light-emitting element 6 and/or power any other electrical components that may be included in the lighting device 1. The circuitry 7 is connected to the light-emitting element 6. It is to be understood that the circuitry 7 is illustrated only schematically in FIG. 1. The circuitry 7 may be capable of at least converting between Alternating Current and Direct Current and converting voltage into a suitable voltage for operating or driving the light-emitting element 6. The circuitry 7 may include electronics such as a driver, a controller and/or wiring for conveying electricity to the light-emitting element 6.

As indicated in FIG. 1, the light-emitting element 6 may be optically coupled to the light in-coupling portions 4, 5, such that light emitted by the light-emitting element 6 is coupled into the core section 14 via the light in-coupling portions 4, 5. The core section 14 may be arranged to guide light coupled into the core section 14 to a light out-coupling portion of the light guide 2, schematically indicated at 8 in FIG. 1, for coupling of light out of the light guide 2. The light out-coupling portion 8 of the light guide 2 may be located at a portion of the interface between the core section 14 and the cladding section 15. The portion of the interface between the core section 14 and the cladding section 15 may comprise at least one light out-coupling element, which for example may comprise scattering particles arranged within the cladding section 15, and/or surface irregularities at an outer surface of the core section 14 and/or at an inner surface of the cladding section 15, which inner surface of the cladding section 15 may be coupled to the outer surface of the core section 14. In alternative or in addition there may be scattering particles arranged within the core section 14 for coupling of light out of the light guide 2. The scattering particles arranged within the core section 14 may for example be embedded in the core section 14. The scattering particles may for example comprise or be constituted by $Al_2O_3$ particles, $TiO_2$ particles, and/or $BaSO_4$ particles. Any scattering particles arranged within or embedded in the core section 14 may for example have an index of refraction different from portions of the core section 14 surrounding the scattering particles, thereby allowing or facilitating light impinging on the scattering particles to be coupled out of the (core section 14 of the) light guide 2. The surface irregularities may for example comprise or be constituted by (relatively small) deformations in the outer surface of the core section 14 and/or the inner surface of the cladding section 15. By way of the light out-coupling portion 8 of the light guide 2, light may be output from (or emitted by) the lighting device 1.

The lighting device 1 comprises an at least in part light-transmissive surface structure, or envelope, 9. The surface structure or envelope 9 in part defines a space 10 in which at least a portion of the light guide 2 is arranged, such that the surface structure 9 at least in part encloses the light guide 2. As illustrated in FIG. 1, the surface structure 9 may be pear-shaped, although it is to be understood that the surface structure 9 may in principle have any shape, such as, for example, tube-shaped. Light out-coupled from the light guide 2 by way of the light out-coupling portion 8 of the light guide 2 may be output from the lighting device 1 through the surface structure 9, by virtue of it being at least in part light-transmissive.

Although not illustrated in FIG. 1, the lighting device 1 may possibly comprise a support structure, which may provide support for the light guide 2 within the space 10. Such a support structure may for example include a stem and/or support wires similar to what may be used in a conventional incandescent light bulb. For example, the stem may support the support wires (which may be connected to the stem), and the support wires may be connected or coupled to the light guide 2 at one or more locations on the light guide 2.

The lighting device 1 comprises a base portion 11. The surface structure 9 may be coupled to the base portion 11 for example by means of a glue connection. According to the embodiment of the present invention illustrated in FIG. 1, the light-emitting element 6 may be arranged within the base portion 11. As indicated in FIG. 1, a portion of the light guide 2 may be arranged within the base portion 11, and another portion of the light guide 2 may be arranged within the space 10 that is defined by the surface structure 9. According to the embodiment of the present invention illustrated in FIG. 1, the circuitry 7 is arranged within the base portion 11.

The lighting device 1 may for example be included in or constitute a LED bulb or retrofit lamp which is connectable to a lamp or luminaire socket by way of an appropriate connector 12 or cap, for example an Edison screw base such as illustrated in FIG. 1, or another type of connection suitable for the lamp or luminaire known in the art, such as, for example, a bayonet fitting or mount (not shown in FIG. 1). As illustrated in FIG. 1, the connector 12 may be connected to the base portion 11. The connector 12 may for example be made of metal, and may have any diameter as required or desired.

It is to be understood that the lighting device 1 may comprise additional components, such as, for example, electrical wiring or conductors for electrically connecting components of the lighting device 1, and a control and/or processing module or unit for controlling operation of the light-emitting element 6 by means of transmitting control signals to the light-emitting element 6. Such possible additional components are not shown in FIG. 1.

FIGS. 2 to 6 are schematic sectional views of light guides 2 in accordance with respective embodiments of the present invention. Each of FIGS. 2 to 6 illustrates a cross section of the light guide 2 in a plane perpendicular to the central axis 3 (not shown in FIGS. 2 to 6) of the light guide 2. Each of the light guides 2 illustrated in FIGS. 2 to 6 may be included in the lighting device 1 illustrated in FIG. 1.

With reference to FIGS. 2 and 4 to 6, the light guide 2 comprises a core section 14, which extends along the central axis of the light guide 2, and which core section 14 is arranged to guide light. The light guide 2 comprises a cladding section 15. In accordance with the embodiments of the present invention illustrated in FIGS. 2 and 4 to 6, the cladding section 15 is surrounding the core section 14, and is coupled to an outer surface 22 of the core section 14 at an inner surface 16 of the cladding section 15. The cladding section 15 is extending along the central axis of the light guide 2.

Figure 3:
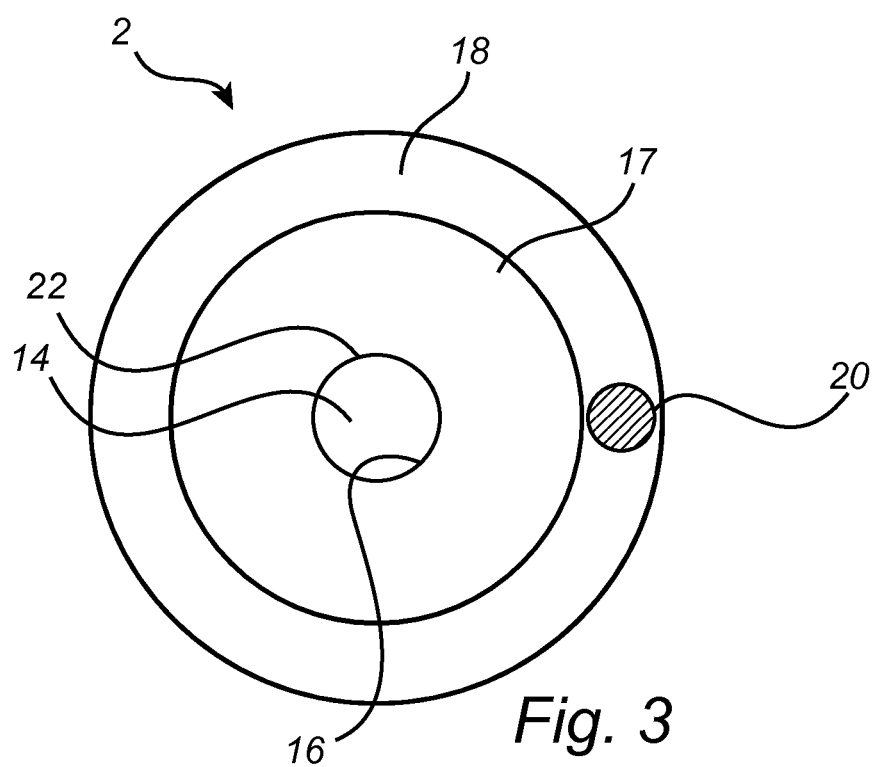

With reference to FIG. 3, the light guide 2 comprises a core section 14 which extends along the central axis of the light guide 2, and which core section 14 is arranged to guide light. The light guide 2 comprises a cladding section 17, 18. In accordance with the embodiment of the present invention illustrated in FIG. 3, the cladding section 17, 18 is surrounding the core section 14, and is coupled to an outer surface 22 of the core section 14 at an inner surface 16 of the cladding section 17, 18. The cladding section 17, 18 is extending along the central axis of the light guide 2. In accordance with the embodiment of the present invention illustrated in FIG. 3, the cladding section 17, 18 comprises a multi-layered structure 17, 18 having two layers 17, 18. Each of the layers 17, 18 surrounds the core section 14. The layers 17, 18 are arranged on top of each other, with an innermost layer 17 that is closest to the core section 14, and an additional layer 18 that is arranged on the innermost layer 17. Another way to describe the multi-layered structure 17, 18 is that the light guide 2 may comprise a primary cladding section 17 and a secondary cladding section 18.

With reference to FIGS. 2 to 6, a communication element 20 is mechanically coupled to the cladding section 15 or 17, 18. The communication element 20 is arranged for wireless communication. It is to be understood that the communication element 20 is illustrated only schematically in FIGS. 2 to 6. The communication element 20 may for example be arranged for, or capable of, RF wireless communication, and may thus comprise at least one (RF) antenna element, but is not limited thereto.

In accordance with the embodiments of the present invention illustrated in FIGS. 2 to 6, the communication element 20 has an elongated shape and is extending along the central axis of the light guide 2. Although the communication element 20 illustrated in FIGS. 2 to 6 has a circular cross section in a plane perpendicular to the central axis 3, it is to be understood that this is according to an example and that the cross section of the communication element 20 (e. g, in a plane perpendicular to the central axis 3) may have another shape than circular, such as, for example, square, or oval. Although there is only one communication element 20 illustrated in FIGS. 2 to 6, it is to be understood that there may be several communication elements mechanically coupled to the cladding section 15 or 17, 18.

In case there are several light guides comprised in the lighting device 1, there may possibly not be communication element(s) mechanically connected to every one of the light guides, but for example possibly only to one or a few of the light guides.

Figure 2:
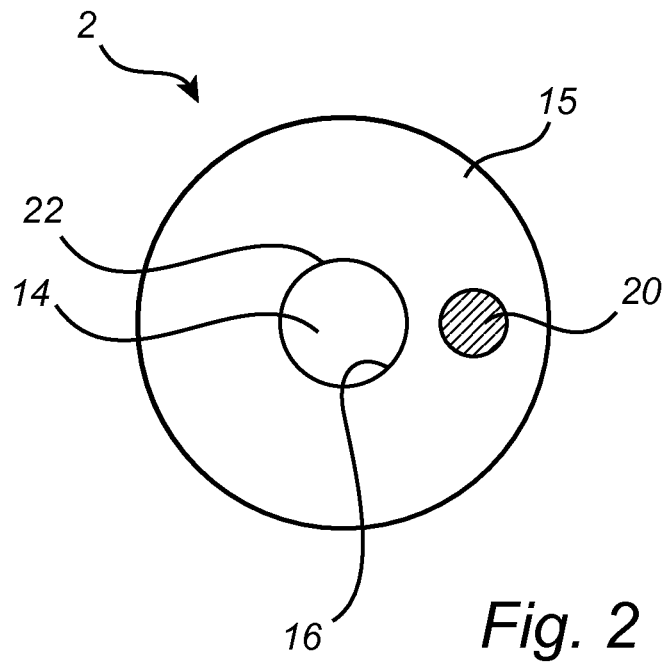
FIGS. 2 to 6 are schematic sectional views of light guides in accordance with respective embodiments of the present invention. Each of FIGS. 2 to 6 illustrates a cross section of the light guide in a plane perpendicular to the central axis of the light guide.

As indicated in FIG. 2, at least a portion of the communication element 20 may be integrally arranged within the cladding section 15.

As indicated in FIG. 3, at least a portion of the communication element 20 may be integrally arranged within the multi-layered structure 17, 18 of the cladding section 17, 18, within the layer 18 that is arranged on the innermost layer 17. The layer 17 may provide additional protection for the core section 14. By integrally arranging at least a portion of the communication element 20 within the layer 18, the risk of the communication element 20 possibly interfering with the optical path of the lighting device 1 may be further reduced or even eliminated.

Figure 4:
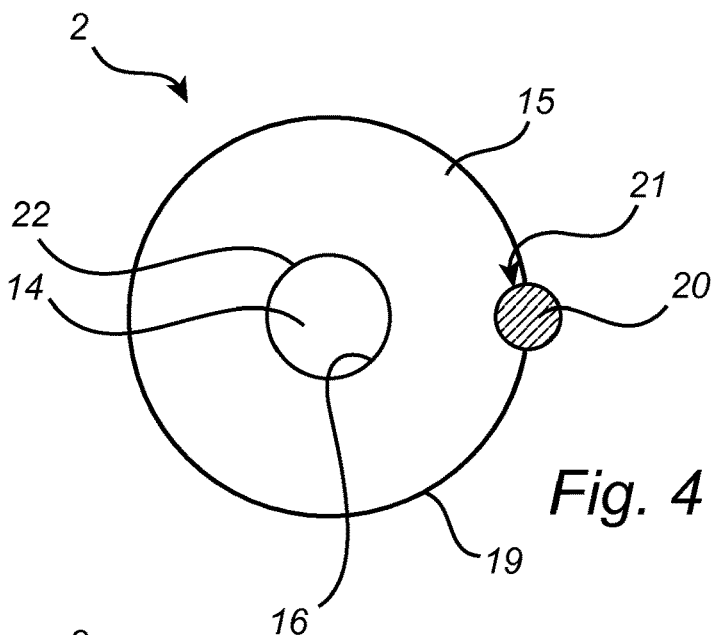

As indicated in FIG. 4, at least a portion of the communication element 20 may be embedded in a recessed portion 21 in the outer surface 19 of the cladding section 15. For example, the communication element 20 may be pressed—possibly at relatively high temperature—into the outer surface 19 of the cladding section 15, thereby forming a recessed portion 21 in the outer surface 19 of the cladding section 15.

Figure 5:
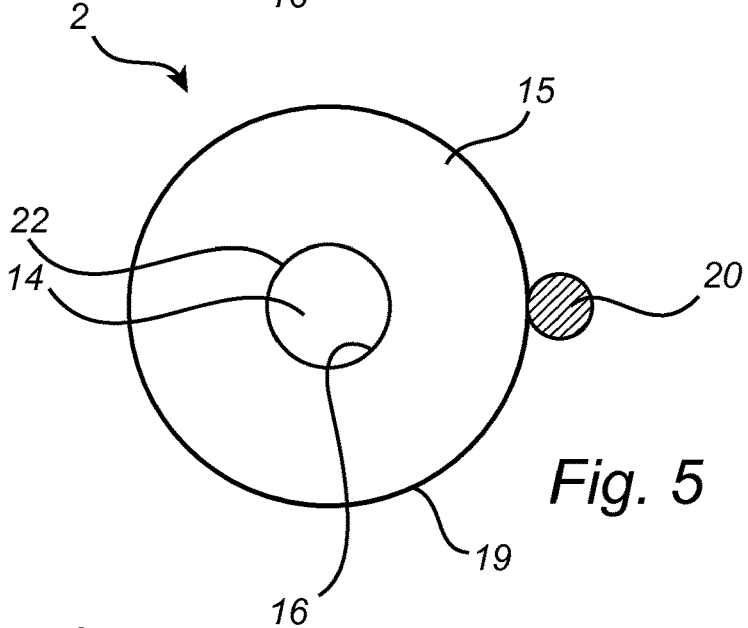

As indicated in FIG. 5, at least a portion of the communication element 20 may be attached or coupled to, or arranged on, the outer surface 19 of the cladding section 15, for example by way of gluing (at least a portion of) the communication element 20 to the outer surface 19 of the cladding section 15.

Figure 6:
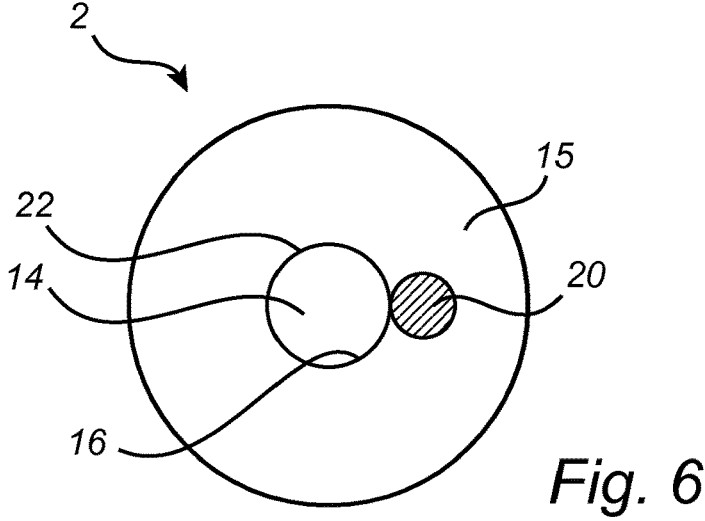

As indicated in FIG. 6, at least a portion of the communication element 20 may be integrally arranged within the cladding section 15, and be arranged such that it contacts the core section 14 at the portion of the interface between the core section 14 and the cladding section 15. Light guided in the core section 14 and which impinges on a portion of the communication element 20 that is contacting the core section 14 may be coupled out of the light guide 2. Thus, the communication element 20 may possibly be used, e.g., locally, to extract light out of the core section 14.

As indicated in FIGS. 2 to 6, (at least a portion of) the communication element 20 may be arranged so as to be extending within the cladding section 15 or 17, 18 along the central axis of the light guide 2. However, other configurations are possible. For example, at least a portion of the communication element 20 may be wound around the core section 14 (FIGS. 2-6) or possibly around the layer 17 of the cladding section 17, 18 (FIG. 3), possibly in a plurality of windings. Such a configuration is illustrated in FIG. 7, which is a schematic sectional side view of a portion of a light guide 2 in accordance with an embodiment of the present invention.

Figure 7:
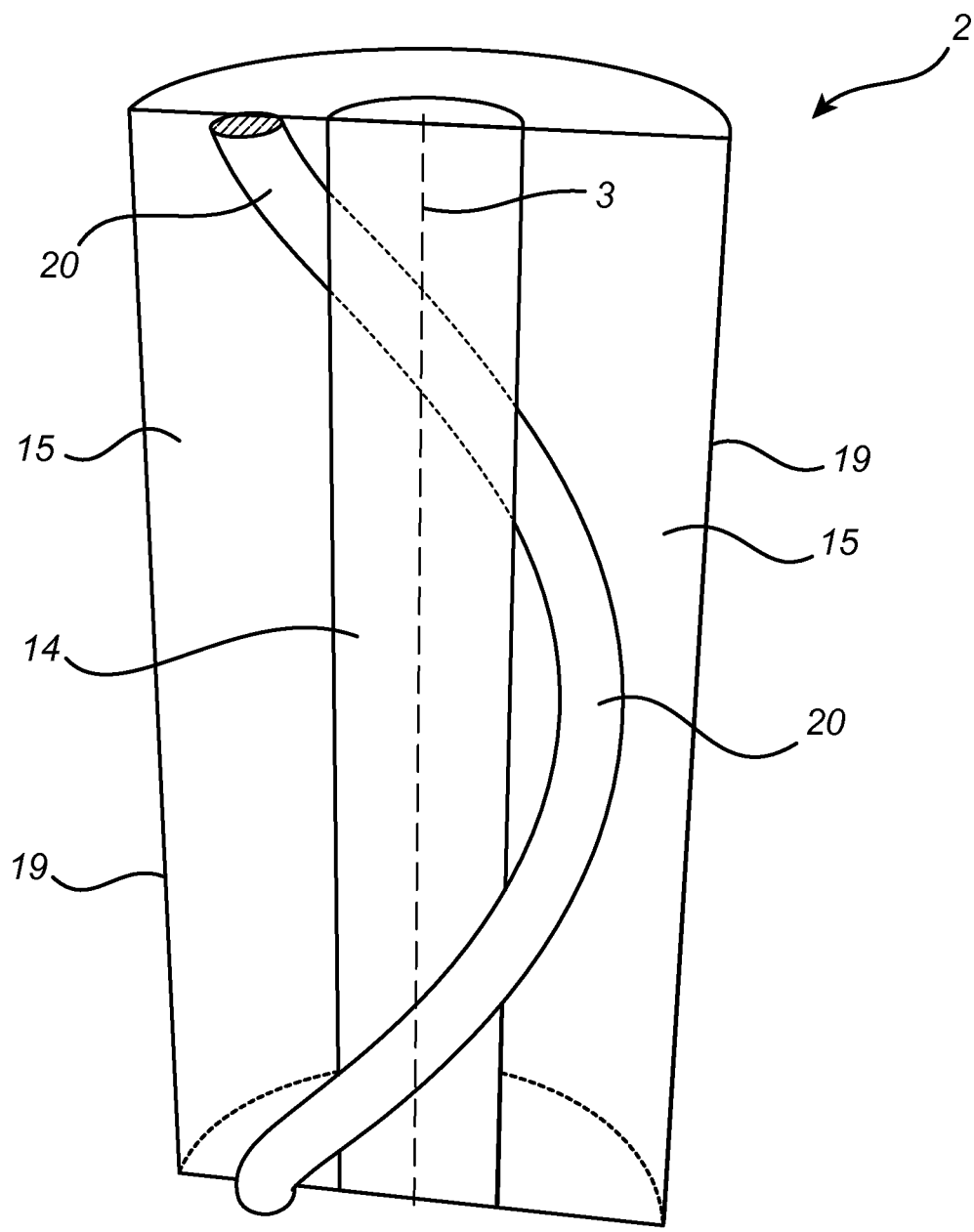
FIG. 7 is a schematic sectional side view of a portion of a light guide in accordance with an embodiment of the present invention.

FIG. 7 illustrates a longitudinal section of a portion of the light guide 2. The light guide 2 illustrated in FIG. 7 may be included in the lighting device 1 illustrated in FIG. 1. The light guide 2 comprises a core section 14, which extends along the central axis 3 of the light guide 2, and which core section 14 is arranged to guide light. The light guide 2 comprises a cladding section 15. In accordance with the embodiment of the present invention illustrated in FIG. 7, the cladding section 15 is surrounding the core section 14, and is coupled to an outer surface 22 of the core section 14 at an inner surface 16 of the cladding section 15. The cladding section 15 is extending along the central axis of the light guide 2. A communication element 20 is mechanically coupled to the cladding section 15. The communication element 20 is arranged for wireless communication. It is to be understood that the communication element 20 is illustrated only schematically in FIG. 7. As indicated in FIG. 7, (at least a portion of) the communication element 20 is arranged so as to be extending within the cladding section 15 along the central axis 3 of the light guide 2, wherein (at least a portion of) the communication element 20 is wound around the core section 14, possibly in a plurality of windings.

In order to manufacture a light guide 2 such as illustrated in FIGS. 1-7, relatively thin glass fibers (for example having a diameter between about 100 μm and about 500 μm) may for example be used. Such fibers may be wound around each other or intertwined in order to form a light guide having a filament shape, which may constitute the core section 14 of the light guide 2. The light guide 2 may or may not be provided with a cladding (e.g., a cladding section, or cladding layer). According to the embodiments of the present invention illustrated in FIGS. 1-7, the light guide 2 is provided with a cladding section 15, and it may possibly also be provided with a protective coating (not shown in FIGS. 1-7). The communication element 20 may then be mechanically coupled or connected to the light guide 2 (e.g., to the core section 14, or to the cladding section 15) for example by way of a glue connection or coupling, or by winding at least a portion of the communication element 20 around the light guide 2 (e.g., around the core section 14, or around the cladding section 15), possibly in a plurality of windings.

According to another example, the light guide 2, or the core section 14 thereof, may for example comprise a polymer such as PMMA, and may be formed from a rod. The rod may for example have a diameter in the range of (about) 0.5 mm to (about) 5 mm. Such a polymer rod may be formed with relative ease into a light guide having a filament shape at a temperature around the glass transition temperature of the polymer. After the shaped rod has cooled, the shape of the light guide may become fixed. The communication element 20 may then be mechanically coupled or connected to the light guide 2 (e.g., to the core section 14, or to the cladding section 15) for example by way of a glue connection or coupling, or by winding at least a portion of the communication element 20 around the light guide 2 (e.g., around the core section 14, or around the cladding section 15), possibly in a plurality of windings.

It is to be understood that the arrangements of the communication element 20 relatively to the core section 14 and the cladding section 15 or 17, 18 as illustrated in FIGS. 2-7 are combinable with each other, in any combination. For example, in accordance with one or more embodiments of the present invention, a portion of the communication element 20 may be integrally arranged within the cladding section 15 such as illustrated in FIG. 2, and another portion of the communication element 20 may be embedded in a recessed portion 21 in the outer surface 19 of the cladding section 15 such as illustrated in FIG. 4.

With further reference to FIG. 1, and while considering any one of the embodiments of the present invention illustrated in FIGS. 2-7, the communication element 20 may be communicatively coupled to the light-emitting element 6. The communicative coupling may be implemented for example by means of any wired and/or wireless communication link as known in the art, for transmitting of signals, commands, data, etc., between the communication element 20 and the light-emitting element 6. The light-emitting element 6 may be configured to receive at least one control signal from the communication element 20 for controlling operation of the light-emitting element 6. The at least one control signal may have been received by means of wireless communication by the at least one communication element 20. The at least one control signal may for example have been transmitted to the lighting device 1 (or to the at least one communication element 20 thereof) by some control device or lighting system controller (not shown in the figures). The light-emitting element—which as mentioned in the foregoing for example may comprise one or more LEDs or other type of solid state light emitter that is controllable with respect to characteristics of emitted light—may thereby be relatively simply controlled with respect to operation thereof (for example with respect to dimming and color setting).

In conclusion a lighting device is disclosed, which comprises a light guide arranged to guide light. The light guide is constituted by or comprise an elongated light guide having a central axis. The light guide comprises a core section that extends along the central axis and that is arranged to guide light. The light guide comprises a cladding section which is at least in part surrounding the core section, is coupled to the core section at an inner surface of the cladding section, and is extending along the central axis. The lighting device comprises at least one communication element mechanically connected or coupled to the cladding section, the at least one communication element being arranged for wireless communication.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting device comprising:
    at least one light-emitting element configured to emit light;
    a light guide arranged to guide light; and
    at least one communication element mechanically connected to the light guide, the at least one communication element being arranged for wireless communication;
    wherein the light guide is elongated and having a central axis, the light guide comprising:
    a core section which extends along the central axis and which is arranged to guide light; and
    a cladding section at least in part surrounding the core section, is coupled to the core section at an inner surface of the cladding section, and is extending along the central axis;
    wherein the at least one communication element is mechanically connected to the cladding section;
    wherein the cladding section is made of an optically transparent material;
    wherein at least a portion of the at least one communication element is integrally arranged within the cladding section;
    wherein the cladding section has a lower index of refraction than the core section;

wherein the at least one communication element is flexible, and wherein at least a portion of the at least one communication element is wound around the core section; and wherein the cladding section comprises a multi-layered structure having a plurality of layers, and wherein at least a portion of the at least one communication element is wound around the core section such that the at least one communication element is surrounded by at least one layer of the multi-layered structure.

2. A lighting device according to claim 1, wherein the light guide further comprises a light in-coupling portion for coupling of light into the light guide;

wherein, the at least one light-emitting element being optically coupled to the light in-coupling portion such that light emitted by the at least one light-emitting element is coupled into the light guide via the light in-coupling portion, wherein the light guide is arranged to guide light coupled into the light guide to a light out-coupling portion of the light guide for coupling of light out of the light guide.

3. A lighting device according to claim 1, wherein the at least one light-emitting element is controllable with respect to characteristics of light emitted by the at least one light-emitting element, and wherein the at least one communication element is communicatively coupled to the at least one light-emitting element, wherein the at least one light-emitting element is configured to receive at least one control signal from the at least one communication element for controlling operation of the at least one light-emitting element, the at least one control signal having been received by means of wireless communication by the at least one communication element.

4. A lighting device according to claim 1, wherein at least a portion of the at least one communication element is arranged such that it contacts the core section at at least one portion of an outer surface of the core section, wherein light guided in the core section and which impinges on a portion of the at least one communication element that is contacting the core section is coupled out of the light guide.

5. A lighting device according to claim 2, wherein the light out-coupling portion of the light guide comprises at least one light out-coupling element comprising at least one of: scattering particles arranged within the core section, or surface irregularities at an outer surface of the core section.

6. A lighting device comprising:
at least one light-emitting element configured to emit light;
a light guide arranged to guide light; and
at least one communication element mechanically connected to the light guide, the at least one communication element being arranged for wireless communication;
wherein the light guide is elongated and having a central axis, the light guide comprising:
a core section which extends along the central axis and which is arranged to guide light; and
a cladding section at least in part surrounding the core section, is coupled to the core section at an inner surface of the cladding section, and is extending along the central axis;

wherein the at least one communication element is mechanically connected to the cladding section;
wherein the cladding section is made of an optically transparent material;
wherein at least a portion of the at least one communication element is integrally arranged within the cladding section;
wherein the cladding section has a lower index of refraction than the core section; and
wherein the cladding section comprises a multi-layered structure having a plurality of layers, wherein at least a portion of the at least one communication element is integrally arranged within a layer other than the innermost layer that is closest to the core section.

7. A lighting device according to claim 1, wherein at least a portion of the at least one communication element is coupled to an outer surface of the cladding section.

8. A lighting device according to claim 7, wherein at least a portion of the at least one communication element is embedded in a recessed portion in the outer surface of the cladding section.

9. A lighting device according to claim 7, wherein the at least one communication element is flexible, and wherein at least a portion of the at least one communication element is wound around the outer surface of the cladding section.

10. A lighting device comprising:
at least one light-emitting element configured to emit light;
a light guide arranged to guide light; and
at least one communication element mechanically connected to the light guide, the at least one communication element being arranged for wireless communication;
wherein the light guide is elongated and having a central axis, the light guide comprising:
a core section which extends along the central axis and which is arranged to guide light; and
a cladding section at least in part surrounding the core section, is coupled to the core section at an inner surface of the cladding section, and is extending along the central axis;
wherein the at least one communication element is mechanically connected to the cladding section;
wherein the cladding section is made of an optically transparent material;
wherein at least a portion of the at least one communication element is integrally arranged within the cladding section;
wherein the cladding section has a lower index of refraction than the core section; and
an at least in part light-transmissive surface structure at least in part defining a space in which at least a portion of the light guide is arranged such that the at least in part light-transmissive surface structure at least in part encloses the light guide.

11. A lamp, luminaire or lighting system comprising a lighting device according to claim 1.

* * * * *